No. 692,551. Patented Feb. 4, 1902.
E. R. SCHLICK.
ICE CREAM FREEZER.
(Application filed June 3, 1901.)

(No Model.)

Witnesses:
E. F. Wilson
John Snowhook

Inventor:
Ernst R. Schlick
By Rudolph Wm. Lotz
Attorney.

THE NORRIS PETERS CO., PHOTO-LITHO., WASHINGTON, D. C.

UNITED STATES PATENT OFFICE.

ERNST R. SCHLICK, OF CHICAGO, ILLINOIS.

ICE-CREAM FREEZER.

SPECIFICATION forming part of Letters Patent No. 692,551, dated February 4, 1902.

Application filed June 3, 1901. Serial No. 62,993. (No model.)

*To all whom it may concern:*

Be it known that I, ERNST R. SCHLICK, a citizen of the United States, residing at Chicago, in the county of Cook and State of Illinois, have invented certain new and useful Improvements in Ice-Cream Freezers; and I do hereby declare the following to be a full, clear, and exact description of the invention, such as will enable others skilled in the art to which it appertains to make and use the same.

My invention relates to a novel construction in an ice-cream freezer, the object being to provide a device in which cream and the like can be frozen without the aid of mechanical agitation and from which the frozen cream can be removed without danger of contact with salt or other undesirable substances; and it consists in the features of construction and combinations of parts hereinafter fully described and claimed.

Figure 1:
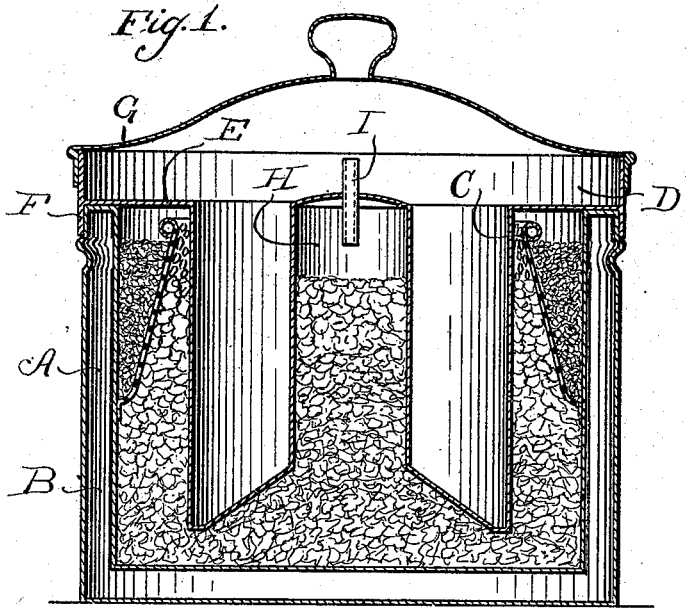
Figure 2:
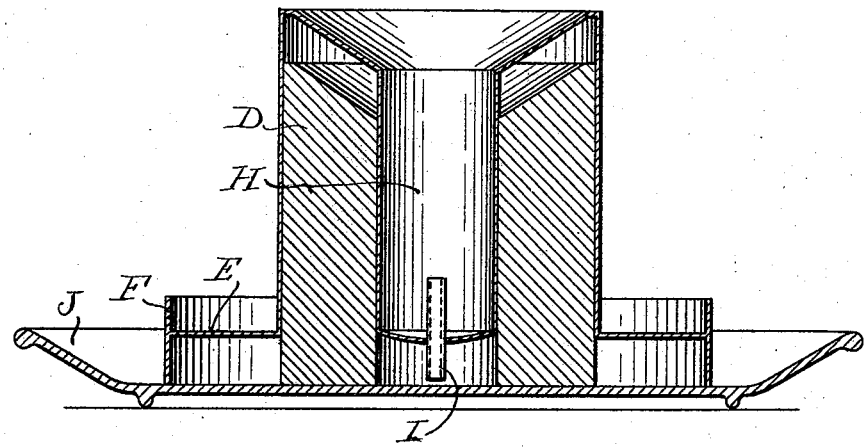

In the accompanying drawings, illustrating my invention, Figure 1 is a central vertical section of a freezer constructed in accordance with my invention. Fig. 2 is a similar section of the central receptacle, showing same inverted on a plate to remove the frozen cream.

My invention consists of a receptacle A, which may be cylindrical or of any other desired form and which is double-walled, so as to provide a space B, containing air or other poor heat-conducting material. On the inner wall of said receptacle A is an annular cone-shaped perforated receptacle C, open at the top and adapted to receive salt. The body of said receptacle A is adapted to receive cracked ice and brine. A vessel D, adapted to receive the liquid to be frozen, fits over and into said receptacle A and consists of a ring-shaped receptacle provided with a circumferential flange E, resting on the upper end of receptacle A. Said flange E is further provided with a circumferential flange F, extending above and below the same and fitting over the receptacle A. The upwardly-extending portion of said flange F is adapted to receive the flanged cover G. In the center of said vessel D is an inverted cup or chamber H, into which the cracked ice and brine are adapted to rise. To permit the escape of air, a vertical tube I is inserted through and secured to the cover of said chamber H, the upper end of said tube being flush with or less in height than the upper edge of said flange F.

The operation of my device is as follows: The receptacle A is partially filled with cracked ice, over which a strong brine is poured, thus making a mixture capable of producing a very low temperature. The receptacle C is then filled with salt. The liquid to be frozen is poured into vessel D and the latter then mounted upon the vessel A, the displaced brine and ice rising in the annular space between the vessel A and vessel D and in the central chamber H to a level above the lower end of receptacle C. The salt in the latter acts as a further heat absorbent and further reduces the temperature. After the vessel D has been in place for a few minutes the contents thereof are stirred for a short time, so as to make the temperature thereof uniform throughout, and it is then allowed to stand until frozen to the desired consistency.

To remove the frozen contents, the vessel A is first removed and then inverted on a plate J. Hot water or cloths soaked with hot water are then applied to the walls to release the frozen mass, which then drops upon said plate. The downwardly-extending portions of the flange F and the tube I prevent any salt water or hot water from dropping on the plate, so that the frozen matter is kept perfectly free of anything injurious to its flavor.

I claim as my invention—

An ice-cream freezer comprising a vessel adapted to contain cracked ice and brine, an annular perforated receptacle in the upper end of said vessel adapted to contain salt, a ring-shaped receptacle adapted to project into said vessel and displace the ice and brine therein and cause the latter to rise to a level above the lower end of said salt-receptacle, an annular flange on said ring-shaped receptacle adapted to rest on the upper end of said vessel, a circumferential flange on said annular flange extending above and below the latter and fitting over said vessel, and an air-vent on the central chamber of said ring-shaped receptacle consisting of a tube extending downwardly into said chamber whereby when said ring-shaped receptacle is inverted said annular flange and said tube serve to prevent any ice or brine from coming in contact with the frozen cream or the platter receiving same.

In testimony whereof I affix my signature in presence of two witnesses.

ERNST R. SCHLICK.

Witnesses:
RUDOLPH WM. LOTZ,
JOHN SNOWHOOK.